(12) United States Patent
Taoka

(10) Patent No.: US 8,964,044 B2
(45) Date of Patent: Feb. 24, 2015

(54) IMAGE PROCESSING APPARATUS AND IMAGE PROCESSING METHOD

(75) Inventor: Mineki Taoka, Kanagawa (JP)

(73) Assignee: Samsung Electronics Co., Ltd (KR)

( * ) Notice: Subject to any disclaimer, the term of this patent is extended or adjusted under 35 U.S.C. 154(b) by 453 days.

(21) Appl. No.: 13/328,545

(22) Filed: Dec. 16, 2011

(65) Prior Publication Data
US 2012/0154611 A1  Jun. 21, 2012

(30) Foreign Application Priority Data

Dec. 20, 2010 (JP) ................................. 2010-283689
Dec. 6, 2011 (KR) ........................ 10-2011-0129701

(51) Int. Cl.
*H04N 5/228* (2006.01)
*H04N 5/232* (2006.01)

(52) U.S. Cl.
CPC ....... *H04N 5/23245* (2013.01); *H04N 5/23248* (2013.01); *H04N 5/23254* (2013.01); *H04N 5/23277* (2013.01)
USPC .................................................... 348/208.4

(58) Field of Classification Search
USPC .......... 348/208.2, 208.4, 221.1, 208.1–208.99
See application file for complete search history.

(56) References Cited

U.S. PATENT DOCUMENTS

| 7,960,676 | B2 * | 6/2011 | Sambongi | 250/208.1 |
| 2002/0003896 | A1 * | 1/2002 | Yamazaki | 382/135 |
| 2007/0115364 | A1 * | 5/2007 | Kumaki | 348/208.99 |
| 2007/0211166 | A1 * | 9/2007 | Niikura | 348/362 |
| 2008/0136931 | A1 * | 6/2008 | Hatanaka et al. | 348/222.1 |
| 2010/0092093 | A1 * | 4/2010 | Akatsuka et al. | 382/203 |
| 2012/0154611 | A1 * | 6/2012 | Taoka | 348/208.4 |

FOREIGN PATENT DOCUMENTS

JP  2006086741  3/2006

* cited by examiner

*Primary Examiner* — Roberto Velez
*Assistant Examiner* — Tuan Le
(74) *Attorney, Agent, or Firm* — The Farrell Law Firm, P.C.

(57) ABSTRACT

An image processing apparatus continuously captures a plurality of unit images, extracts and sets a feature point to be compared from each unit image, detects a feature point corresponding to that of another unit image reduces an error between the unit images superposes the unit images, and calculates the feature point detection range according to a maximum number of pixels allowing shake not to be substantially perceived in the unit image. A motion detection range is set to a minimum in case of superposition of each image when hand-shake is corrected by composite synthesis, thereby reducing image processing load and increasing image processing speed.

16 Claims, 4 Drawing Sheets

IMAGE PROCESSING APPARATUS AND IMAGE PROCESSING METHOD

PRIORITY

This application claims priority under 35 U.S.C. §119(a) to a Japanese Patent Application filed in the Japan Patent Office on Dec. 20, 2010 and assigned Serial No. JP 283689/2010, and a Korean Patent Application filed in the Korean Intellectual Property Office on Dec. 6, 2011 and assigned Serial No. 10-2011-0129701, the contents of both of which are incorporated herein by reference.

BACKGROUND OF THE INVENTION

1. Field of the Invention

The present invention relates generally to an image processing method and apparatus, and more particularly, to an image processing apparatus such as a digital camera, which captures a still frame and performs image processing with respect to the captured frame, and an image processing method for correcting hand-shake by using a composite synthesizing technique.

2. Description of the Related Art

Composite synthesis, which is also referred to as still frame Electronic Image Stabilization (EIS), is a noise cancellation technique based on superposition of a plurality of images, and is used for hand-shake correction in a camera of a device such as a cellular phone. In hand-shake correction, a plurality of images are automatically and continuously captured within a short time through one-time capturing manipulation by a manipulator, and each image is superposed with correction of an error (discrepancy) caused by hand-shake. For this reason, a technique such as pixel shift or shape correction is required.

FIG. 1 illustrates a conventional technique for hand-shake correction.

In FIG. 1, a continuously captured image output from a sensor is developed and stored in an internal memory such as a Synchronous Dynamic Random Access Memory (SDRAM). Feature points of a plurality of images are detected. By comparing these feature points, motion detection is performed, it is determined whether an image is moved due to hand-shake or distorted through inclination, and pixel shift or affine conversion is performed. This result is additive-synthesized, thus performing composite synthesis.

However, there are various techniques for composite synthesis, such as motion vector detection and image object recognition.

For a range of motion detection, there exists only a technique for properly setting a limit of hand-shake by a manipulator and determining a maximum necessary range from the limit. For example, Japanese Patent Publication No. 2006-86741 discloses requiring the maximum shake amount on an image from a focal length, a pixel pitch, and the maximum width of hand-shake, and searching the range.

However, because of the manipulator, it is difficult to predict the limit of hand-shake in view of such variables as a composition of the camera, and a manner by which to hold the camera and the manipulator. If a range of motion detection is properly set with a margin as in a conventional technique, a heavy load is imposed on image processing in superposition. For this reason, it is required to set the range as narrow as possible. To this point, however, the prior art has not considered this requirement.

SUMMARY OF THE INVENTION

Accordingly, an aspect of the present invention provides an image processing apparatus and an image processing method, which in hand-shake correction through composite synthesis, minimize a motion detection range when superposing each image to reduce a load of, and improve the speed of, image processing.

To achieve the foregoing aspect, an image processing apparatus and an image processing method are provided for continuously capturing a plurality of unit images, extracting and setting a feature point to be compared from each unit image, detecting a feature point corresponding to the feature point of the unit image from another unit image in a feature point detection range, reducing an error between the unit images by moving and modifying the unit image based on declination of the feature points, and outputting a synthesized image by superposing the unit images in which the feature point detection range (also referred to as a motion detection range) is set based on a hand-shake limit pixel number, which is the maximum number of error pixels allowing hand-shake or blur resulting therefrom not to be substantially perceived in the unit image.

BRIEF DESCRIPTION OF THE DRAWINGS

The above and other features and advantages of an embodiment of the present invention will be more apparent from the following detailed description taken in conjunction with the accompanying drawings, in which.

DETAILED DESCRIPTION OF AN EMBODIMENT OF THE INVENTION

Figure 1:
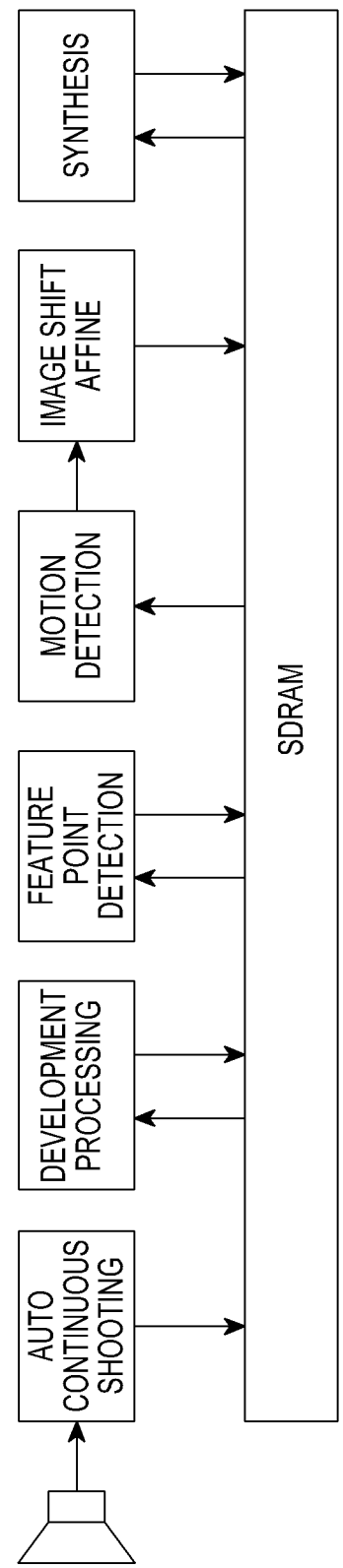
FIG. 1 illustrates composite synthesis in a conventional digital camera.

Hereinafter, an embodiment of the present invention will be described in detail with reference to the accompanying drawings. In the following description, the same elements will be designated by the same reference numerals although they are shown in different drawings. Further, a detailed explanation of known related functions and constitutions may be omitted for the sake of clarity and conciseness.

The present invention has been made considering that if each image is shaken prior to superposition, even a hit of a motion vector will have no affect, and conversely, a feature that each image to be superposed has no blur due to shake is a fundamental feature which serves as a significant parameter for determining a motion detection range.

Figure 2:
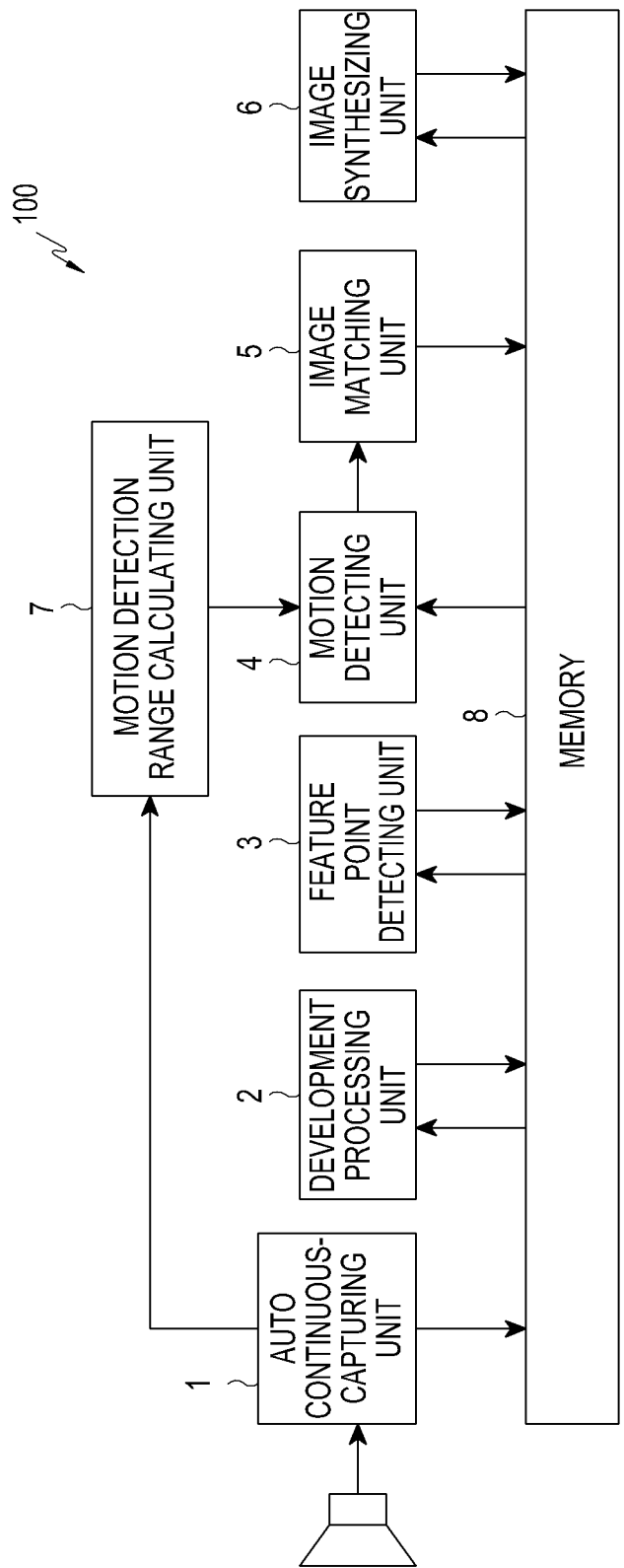
FIG. 2 illustrates a structural diagram of a digital camera according to an embodiment of the present invention.

A digital still camera 100, which is an image processing apparatus according to an embodiment of the present invention, will be described in brief with reference to FIG. 2. The digital still camera 100 includes an information processing apparatus such as a Central Processing Unit (CPU) and an internal memory (not shown), and a function of each component shown in FIG. 2 is implemented by a software function which is added to hardware and obtained as the CPU operates according to a program stored in the memory.

In the digital camera 100, a manipulator performs capturing manipulation once by pressing a shutter, after which an object is imaged on a light-receiving element such as a Charge Coupled Device (CCD) or CMOS area through a lens, and is converted into an electric signal that is converted into a digital signal by an Analog-to-Digital (AD) converter.

An auto continuous-capturing unit 1 performs continuous-capturing a plurality of times at intervals. An image converted into a digital signal at intervals through continuous-capturing is stored in an internal memory 8 such as a Synchronous Dynamic Random Access Memory (SDRAM).

A development processing unit 2 receives each unit image (Bayer-array original image) converted into the digital signal, performs processing on each of the original images, such as by white balance adjustment, color interpolation and YCbCr image conversion, and stores the processed images in the internal memory 8.

Figure 3:
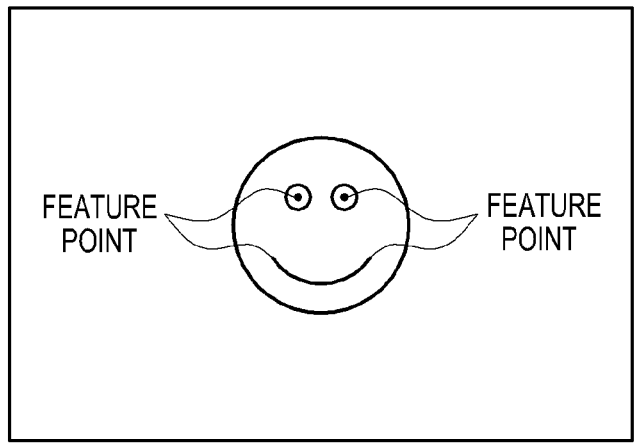
FIG. 3 describes feature points according to an embodiment of the present invention.

A feature point detecting unit 3 extracts and sets a feature point from the unit image (YCbCr image) output from the development processing unit 2, and stores that feature point information in the internal memory 8. More specifically, as shown in FIG. 3 which describes feature points, an edge portion from a unit image where a contrast is large or a color change portion where a color is different from surrounding portions is extracted as a feature point.

Figure 4:
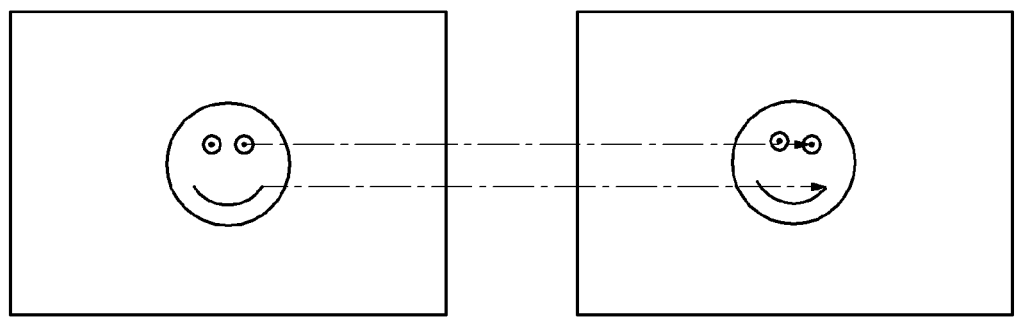
FIG. 4 illustrates a change of a unit image according to an embodiment of the present invention.

Returning to FIG. 2, a motion detecting unit 4 detects corresponding feature points between unit images (more specifically, adjacent unit images) in a detection range based on the feature point information. For example, if a coordinate position of a feature point in a unit image is (x, y), a feature point in a detection range, i.e., in a range of a number of pixels from the coordinate position (x, y), is searched for in another unit image which is a target for detection. In FIG. 4, which illustrates a change of a unit image, motion detection is performed with respect to a right-side unit image based on a left-side unit image. The right-side unit image has moved in a right-upward direction and has rotated slightly in a clockwise direction with respect to the left-side unit image, but motion in the image can be calculated based on corresponding feature points.

Returning again to FIG. 2, an image matching unit 5 moves and modifies a unit image based on declination of the feature points, thus reducing or removing an error between unit images. More specifically, shape conversion processing is performed based on such functions as pixel shift, rotation and affine conversion, and positions of feature points in a plurality of unit images are made congruent with each other, so that the object images are identical to each other. The result is stored in the internal memory 8.

An image synthesizing unit 6 performs additional processing with respect to the plurality of unit images which have been modified by the image matching unit 5 to almost overlap each other, and performs dynamic range adjustment with respect to an output. As a result, an additive synthesized image having a small amount of noise is obtained. Thus, the image synthesizing unit 6 superposes each unit image, thereby outputting the synthesized image.

The current embodiment further includes a motion detection range calculating unit 7 for determining the feature point detection range used in the motion detecting unit 4.

The motion detection range calculating unit 7 sets, in a unit image, the feature point detection range based on a hand-shake limit pixel indicating a maximum error range in which substantial blur is not recognized.

An apparatus or operation of the current embodiment may be noise reduction using composite synthesis of a still frame or still frame Electronic Image Stabilization (EIS), which is intended to obtain an image having no hand-shake even when image capturing is performed in the same condition as when hand-shake is generated. In this case, each unit image is continuously captured at a speed that is sufficiently high for ignoring hand-shake.

Figure 5:
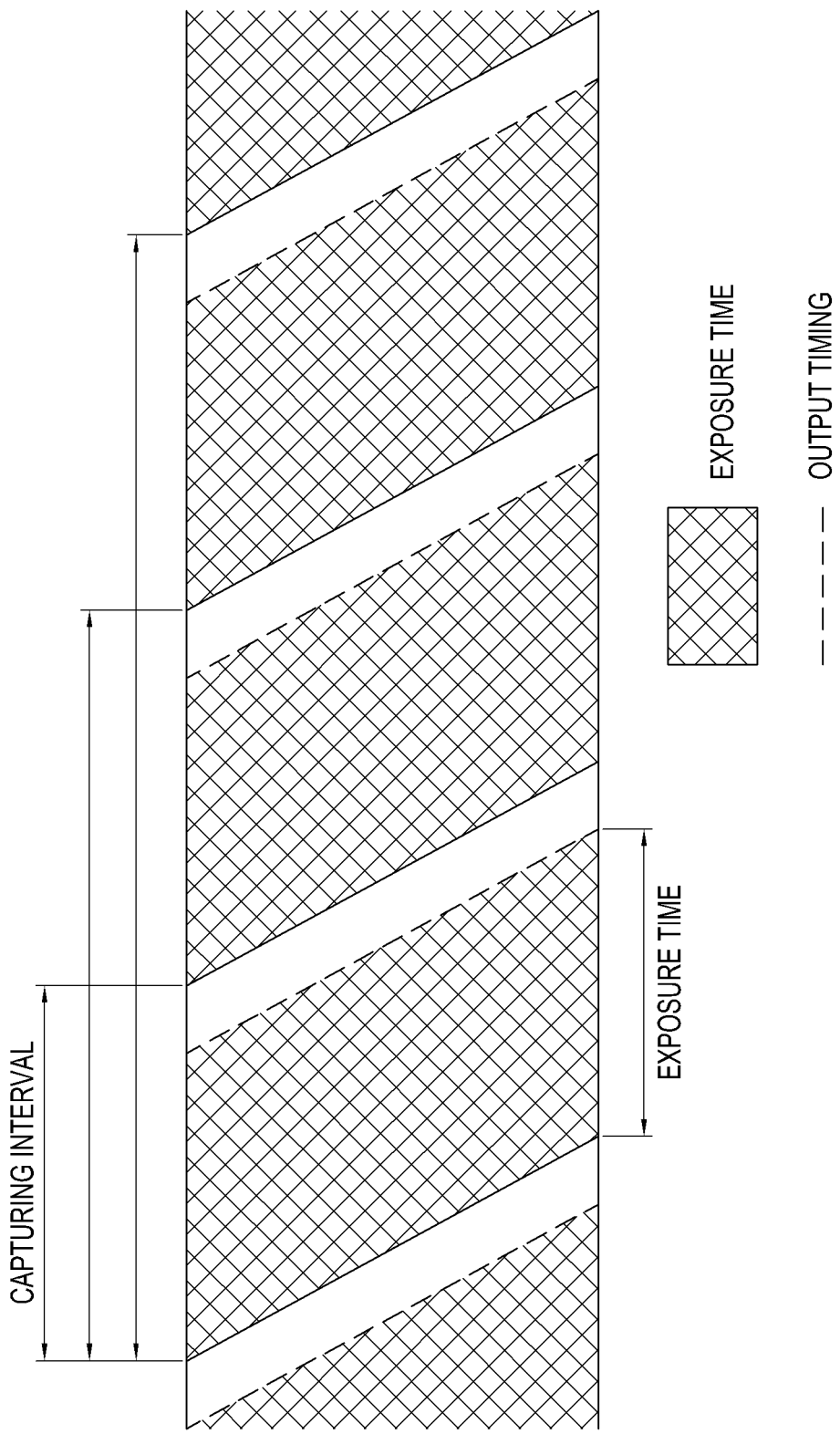
FIG. 5 describes an exposure time and a capturing interval of a Complementary Metal-Oxide Semiconductor (CMOS) sensor according to an embodiment of the present invention.

FIG. 5 illustrates exposure and output timings of a CMOS sensor, which is a light-receiving element. The CMOS sensor used in a camera of a device such as a cellular phone performs photoelectric conversion only when it may electrically receive light, so that exposure is made only during a period indicated as the exposure time in FIG. 5. In view of each pixel, the exposure timing varies from the top to the bottom of an image, but pixels in the image are exposed during the same exposure time.

Since there is no blur originating from hand-shake in the image captured during the exposure time, the exposure time of FIG. 5 needs to be sufficiently short with respect to hand-shake. On the other hand, if the exposure time lasts longer than the hand-shake limit, improvement of hand-shake may not be realized even if addition processing is performed at a later stage.

For this reason, the motion detection range calculating unit (7) in FIG. 2 sets the motion detection range on the assumption that (1) motion is made only within a hand-shake limit during the exposure time, and (2) hand-shake is generated at the same rate in a short time, by using Equation (1), as follows:

Motion Detection Range (pixel)=Hand-Shake Limit Pixel Number (pixel)/Exposure Time(sec)×Capturing Interval(sec)   (1)

In Equation (1), the motion detection range would match the hand-shake limit pixel number if the capturing interval matches the exposure time, which is virtually impossible. Further in Equation (1), if the exposure time is short and the capturing interval becomes longer than the exposure time, the next unit image is thought to be changed during a non-exposure time, such that a search range will be extended by extending the motion detection range beyond the hand-shake limit.

Herein, the hand-shake limit is a maximum pixel number of a unit image in which image blur does not occur due to shake, and the hand-shake limit can be easily preset physically and objectively. For example, one of two identical superposed unit images is shifted pixel-by-pixel, such that the number of pixels shifted immediately before an operator recognizes blur caused by an error is set as a hand-shake limit and is registered in a memory.

In this manner, if there is no blur or shake in each unit image prior to superposition, the motion detection range is set based on a hand-shake limit pixel number which can be set physically and objectively. Therefore, unlike in a conventional technique where the motion detection range is properly prescribed with a margin, the motion detection range can be set to a minimum. Consequently, a load of image processing is significantly reduced, operations are be performed at higher speed and with lower power consumption than conventional composite synthesis, and substantial response improvement is realized.

The present invention is not limited to the foregoing embodiment. For example, the present invention also is also applicable to a digital movie camera capable of recording a moving image. The present invention can be modified without departing from the object of the present invention.

While the present invention has been shown and described with reference to certain embodiments and drawings of the portable terminal, it will be understood by those skilled in the art that various changes in form and details may be made therein without departing from the spirit and scope of the invention as defined by the appended claims and their equivalents.

What is claimed is:

1. An image processing apparatus comprising:
   an auto continuous-capturing unit for continuously capturing a plurality of unit images;
   a feature point detecting unit for extracting and setting a feature point to be compared from each unit image;
   an image matching unit for reducing an error between the unit images by moving and modifying the unit image based on declination of the feature points;
   an image synthesizing unit for outputting a synthesized image by superposing the unit images;
   a motion detection range calculating unit for adjusting a size of a motion detection range for detecting the feature point by using a hand-shake limit pixel number, exposure time and capturing interval, wherein the hand-shake limit pixel number is the maximum number of pixels allowing shake not to be substantially perceived in the unit image; and
   a motion detecting unit for detecting a feature point corresponding to the feature point of the unit image from another unit image in the motion detection range.

2. The image processing apparatus of claim 1, wherein the motion detection range calculating unit adjusts the size of the motion detection range by using the following Equation:

motion detection range (pixel)=the hand-shake limit pixel number (pixel)/exposure time (sec)×the capturing interval+(sec).

3. The image processing apparatus of claim 1, wherein the feature point is an edge portion of the unit image in which a contrast exceeds a reference value.

4. The image processing apparatus of claim 1, wherein the feature point is a color change portion of the unit image in which a color is different from other portions of the unit image.

5. The image processing apparatus of claim 1, wherein the motion detecting unit searches in the another unit image for a corresponding feature point within a range of a number of pixels from an image coordinate position of the feature point of the unit image.

6. The image processing apparatus of claim 1, wherein the image matching unit moves and modifies the unit image to match positions of feature points between the unit images.

7. The image processing apparatus of claim 6, wherein the image synthesizing unit performs additional processing with respect to the modified unit image.

8. The image processing apparatus of claim 1, wherein the auto continuous-capturing unit continuously captures the plurality of unit images through one-time capturing manipulation of a manipulator.

9. An image processing method comprising:
   an auto continuous-capturing step of continuously capturing a plurality of unit images;
   a feature point detecting step of extracting and setting a feature point to be compared from each unit image;
   an image matching step of reducing an error between the unit images by moving and modifying the unit image based on declination of the feature points;
   an image synthesizing step of outputting a synthesized image by superposing the unit images;
   a motion detection range calculating step of adjusting a size of a motion detection range for detecting the feature point by using a hand-shake limit pixel number, exposure time and capturing interval, wherein the hand-shake limit pixel number is the maximum number of pixels allowing shake not to be substantially perceived in the unit image; and
   a motion detecting step of detecting a feature point corresponding to the feature point of the unit image from another unit image in the motion detection range.

10. The image processing method of claim 9, wherein the motion detection range calculating step comprises adjusting the size of the motion detection range by using the following Equation:

motion detection range (pixel)=the hand-shake limit pixel number (pixel)/exposure time (sec)×the capturing interval (sec).

11. The image processing method of claim 9, wherein the feature point is an edge portion of the unit image in which a contrast exceeds a reference value.

12. The image processing method of claim 9, wherein the feature point is a color change portion of the unit image in which a color is different from other portions of the unit image.

13. The image processing method of claim 9, wherein the motion detecting step comprises searching in the another unit image for a corresponding feature point within a range of a number of pixels from an image coordinate position of the feature point of the unit image.

14. The image processing method of claim 9, wherein the image matching step comprises moving and modifying the unit image to match positions of feature points between the unit images.

15. The image processing method of claim 14, wherein the image synthesizing step comprises performing additional processing with respect to the modified unit image.

16. The image processing method of claim 9, wherein the auto continuous-capturing step comprises continuously capturing the plurality of unit images through one-time capturing manipulation of a manipulator.

* * * * *